This invention relates to a novel saw filing gauge.

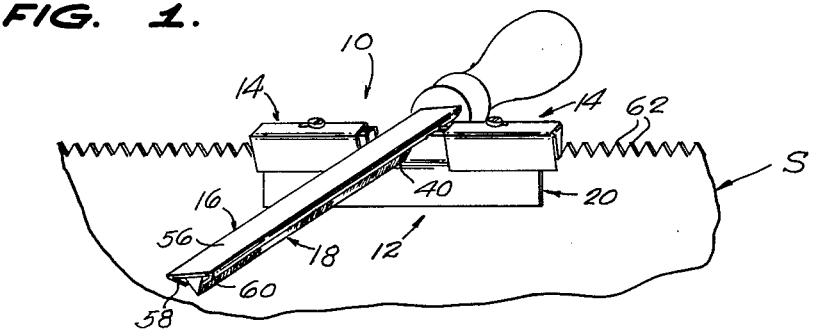
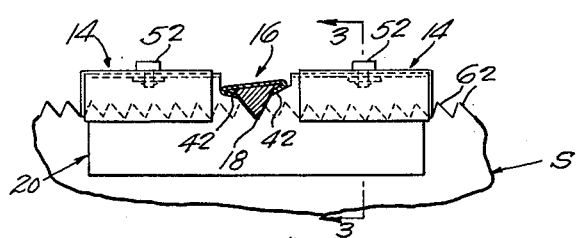
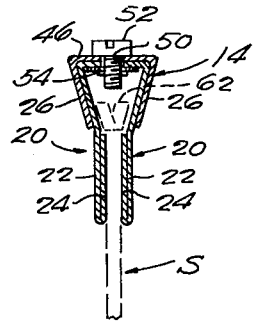
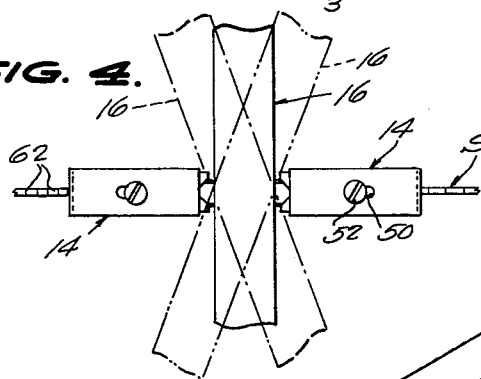
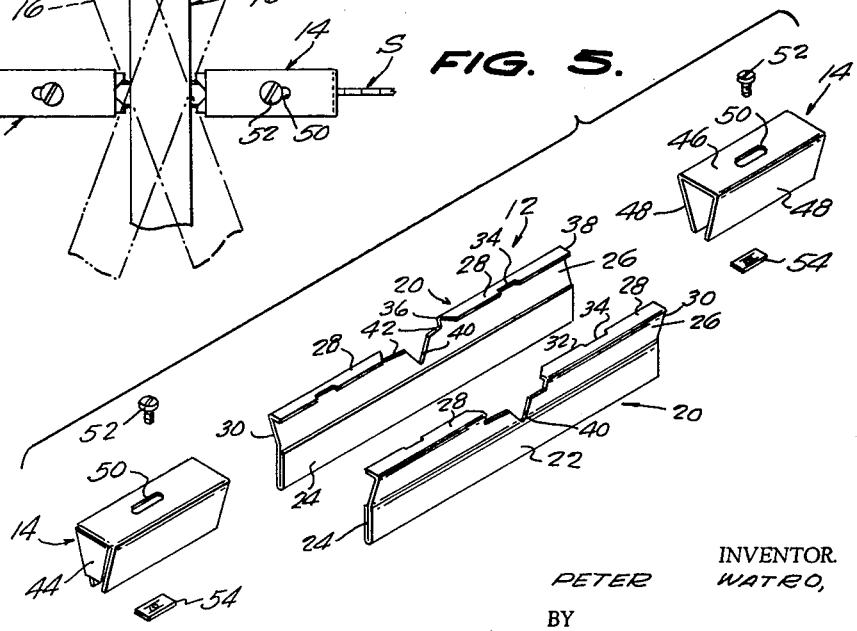
INVENTOR.
PETER WATRO, 3,166,956
SAW FILING GAUGE
Peter Watro, 156 Muir Ave., Hazleton, Pa.
Filed July 5, 1963, Ser. No. 292,950
5 Claims. (Cl. 76—36)

The primary object of the invention is the provision of an efficient, inexpensive, practical, and easily used device of this kind, especially but not exclusively for use in filing hand saws, which enables accurate and uniform hand filing as to depth, pitch, and bevel of the teeth of a saw.

Another object of the invention is the provision of a device of the character indicated above which comprises a gauge unit composed of a pair of members having file guiding notches, a pair of longitudinally adjustable saw tooth gullet engaging extensions on the gauge unit, at opposite sides of the notches, and a file holder, for a triangular file, which slides on the sides of the notches, the members of the gauge unit being adapted to be adjusted longitudinally relative to each other to shift the notches so as to provide for the predetermined angling of the file and its holder, relative to the plane of a saw held in a vise.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view showing a device of the present invention installed on a hand saw, with the file and its holder applied to the gauge unit for filing a saw tooth;

FIGURE 2 is a fragmentary side elevation of FIGURE 1, partly in section;

FIGURE 3 is an enlarged vertical transverse section taken on the line 3—3 of FIGURE 2;

FIGURE 4 is a top plan view of FIGURE 3, showing the file unit disposed at right angles to the saw, in full lines, and in angled positions relative thereto, in phantom lines; and, FIGURE 5 is an exploded perspective view of the device.

Referring in detail to the drawings, wherein like numerals designate like parts throughout the several views, the illustrated device, generally designated 10, comprises a gauge unit 12, a pair of extensions 14 therefor, and file holder 16, for a triangular file 18.

The gauge unit 12 comprises a pair of similar and coextensive, longitudinally elongated, sheet metal, saw blade clamps 20. Each clamp comprises a normally perpendicular lower portion 22, of double thickness, achieved by bending up along its inner side a flange 24 which is coextensive with the portion 22. The lower portion 22 merges into an upper portion 26 which is angled upwardly and laterally outwardly out of the plane of the lower portion 22. Longitudinally spaced and longitudinally elongated normally horizontal, laterally inwardly extending flanges 28 are on the upper edge of the upper portion 26 and reach to the outer ends 30 thereof. The free edges 32 of the flanges 28 are formed with longitudinal notches 34, substantially equally spaced from their inner and outer ends 36 and 38, respectively.

A V-shaped notch 40 is centered between and spaced from the inner ends 36 of the flanges 28 and is formed in the upper edge of the upper portion 26 of the clamp. The upper edge of the upper portion 26, at opposite sides of the notch 40 is formed with downwardly and oppositely angled bearing shoulders 42.

The extensions 14 are similar but reversed in position and are downwardly opening channels preferably formed of sheet metal. The extensions 14 are slightly more than one-third of the length of the gauge unit 12, and comprise top walls 46 and downwardly convergent side walls 48. Pendant tabs 44 on the longitudinally outward ends of the top walls 46 are provided to engage in gullets between adjacent teeth of a saw for holding the device against shifting longitudinally on a saw. The top walls 46 are formed, intermediate their ends, with longitudinal slots 50, to receive retaining screws 52.

The extensions 14 are assembled to the gauge unit by sliding them over the outer ends of the clamps 20, so that their side walls 48 engage the outer surfaces of the upper portions 26 of the clamps, as indicated in FIGURE 2, and so that the screw slots 50 are registered with the flange notches 34 of the clamps, whereat the screws 52 are passed downwardly through the slots 50 and the notches 34 and threaded downwardly through sheet metal nuts 54, until the extensions are clamped adjustably to the clamps with their tabs 44 engaged in selected gullets of a saw.

The file holder 16 is preferably substantially as long as the file 18 to be used, and is in the form of a channel, preferably of sheet metal, composed of a flat top wall 56, and shallow acutely angled side walls 58. The holder 16 is slid endwise over the file 18, so as to leave exposed the major part of the cutting edge 60 of the file.

As shown in FIGURE 2, when the file unit is placed crosswise in the notches 40 of the gauge unit 12, the cutting edge 60 of the file conforms to and is closely spaced relative to the sides of the notches 40, and the side walls 58 of the holder 16 are slidably engaged upon the bearing shoulders 42, at the opposite sides of the notches 40. The saw S to be filed having been clamped in a vise (not shown) with its teeth 62 extending upwardly, the gauge unit is installed over the teeth, with the notches 40 registered with the space between two adjacent teeth. The clamps 20 having been endwise adjusted relative to each other, either to put the notches 40 in registry with each other, or longitudinally displaced relative to each other, so as to predetermine the angle of the file unit to either side of perpendicular relationship to the plane of the saw S desired for beveling edges of the teeth. The extensions 14 are then adjusted and locked in place by means of the screws 52.

As shown in FIGURE 2, the flanges 24 of the lower portions 22 of the clamps 20 engage the opposite sides of the saw S immediately below the teeth 62, the initial spacing of these lower portions being less than the thickness of the saw, so that the inherent resilience of the clamps is employed, when the portions 20 are spread, against the resistance of the extensions 14, to receive the saw, for clamping these portions to the saw. The tabs 44 are proportional in height so that their engagements in gullets between adjacent saw teeth not only support the device on a saw, but prevents the device from subsiding below the prescribed depth and allowing filing of teeth below this depth. The extensions 14 also serve as spacers for keeping uniform space between saw teeth, and to enable the device to be used on saws of diffrent sizes.

In operation, the file unit having been put in place in the gauge unit notches 40, it is moved endwise to file adjacent edges of saw teeth 62 and the subtended notches therebetween, to the proper depth, pitch, and bevel, by manipulating the file unit relative to the gauge unit.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A saw filing gauge comprising an inverted channel gauge unit adapted to be positioned over the teeth of a saw, said gauge unit comprising coextensive clamps engaged with the opposite sides of a saw below its teeth, channel extensions engaged over the ends of the clamps and adapted to compress the clamps against the saw, said extensions being longitudinally spaced from each other, said extensions having pendant tabs adapted to supportably engage in gullets between adjacent teeth of a saw, the upper edges of the clamps being formed with transversely aligned V-shaped notches, between the extensions, inwardly and downwardly angled shoulders on the clamps leading to opposite sides of the notches, and a file holder for a triangular file having angled side walls adapted to slidably bear upon said shoulders, said clamps being resilient and comprising normally perpendicular lower portions spaced from each other at a distance less than the thickness of a saw to be filed, laterally outwardly and upwardly angled upper portions on the upper edges of the lower portions, and laterally inwardly extending flanges along the upper edges of the upper portions.

2. A saw filing gauge comprising an inverted channel gauge unit adapted to be positioned over the teeth of a saw, said gauge unit comprising coextensive clamps engaged with the opposite sides of a saw below its teeth, channel extensions engaged over the ends of the clamps and adapted to compress the clamps against the saw, said extensions being longitudinally spaced from each other, said extensions having pendant tabs adapted to supportably engage in gullets between adjacent teeth of a saw, the upper edges of the clamps being formed with transversely aligned V-shaped notches, between the extensions, inwardly and downwardly angled shoulders on the clamps leading to opposite sides of the notches, and a file holder for a triangular file having angled side walls adapted to slidably bear upon said shoulders, said clamps being resilient and comprising normally perpendicular lower portions spaced from each other at a distance less than the thickness of a saw to be filed, laterally outwardly and upwardly angled upper portions on the upper edges of the lower portions, and laterally inwardly extending flanges along the upper edges of the upper portions, said flanges having free edges formed intermediate their ends with longitudinal notches, said extensions comprising top walls adapted to bear upon said lateral flanges, and downwardly convergent side walls adapted to bear against the outer surfaces of the upper portions of the clamps, said top walls being formed with longitudinal slots, and bolts extending through the slots and the notches of the clamp flanges.

3. A saw filing gauge comprising an inverted channel gauge unit adapted to be positioned over the teeth of a saw, said gauge unit comprising coextensive clamps engaged with the opposite sides of a saw below its teeth, channel extensions engaged over the ends of the clamps and adapted to compress the clamps against the saw, said extensions being longitudinally spaced from each other, said extensions having pendant tabs adapted to supportably engage in gullets between adjacent teeth of a saw, the upper edges of the clamps being formed with transversely aligned V-shaped notches, between the extensions, inwardly and downwardly angled shoulders on the clamps leading to opposite sides of the notches, and a file holder for a triangular file having angled side walls adapted to slidably bear upon said shoulders, said clamps being resilient and comprising normally perpendicular lower portions spaced from each other at a distance less than the thickness of a saw to be filed, laterally outwardly and upwardly angled upper portions on the upper edges of the lower portions, and laterally inwardly extending flanges along the upper edges of the upper portions, said flanges having free edges formed intermediate their ends with longitudinal notches, said extensions comprising top walls adapted to bear upon said lateral flanges, and downwardly convergent side walls adapted to bear against the outer surfaces of the upper portions of the clamps, said top walls being formed with longitudinal slots, and bolts extending through the slots and the notches of the clamp flanges, said tabs being on the longitudinally outward ends of the top walls of the extensions.

4. A saw filing gauge comprising a pair of longitudinally spaced inverted channel extensions having top walls and side walls, said top walls having pendant tabs adapted to engage in gullets between adjacent teeth of a saw and predetermine the depth of cut made in filing the saw, the engagement of the tabs in gullets precluding endwise movements of the extensions relative to a saw, a gauge unit comprising a pair of opposed clamps having file guide notches in their upper edges and spaced from the ends of the clamps, said upper edges having bearing shoulders at opposite sides of and declining to the notches, said clamps being endwise adjustable relative to each other to register their notches, and to put their notches in selected unregistered relationship for determining angles of filing of said teeth, the ends of the clamps being slidably engaged in the extensions, the top walls of the extensions having longitudinal slots, and bolts engaged through the slots and engaged with portions of the clamps for locking the clamps and the extensions in selected positions relative to each other.

5. A saw filing gauge comprising a pair of longitudinally spaced inverted channel extensions having top walls and side walls, said top walls having pendant tabs adapted to engage in gullets between adjacent teeth of a saw and predetermine the depth of cut made in filing the saw, the engagements of the tabs in gullets precluding endwise movements of the extensions relative to a saw, a gauge unit comprising a pair of opposed clamps having file guide notches in their upper edges and spaced from the ends of the clamps, said upper edges having bearing shoulders at opposite sides of and declining to the notches, said clamps being endwise adjustable relative to each other to register their notches, and to put their notches in selected unregistered relationship for determining angles of filing of saw teeth, the ends of the clamps being slidably engaged in the extensions, the top walls of the extensions having longitudinal slots and bolts engaged through the slots and engaged with portions of the clamps for locking the clamps and the extensions in selected positions relative to each other, and a triangular file holder having downwardly convergent side walls adapted to slide upon said bearing shoulders, and a triangular file in the holder having a downwardly extending cutting edge conformably engaged in the notches of the clamps.

References Cited by the Examiner

UNITED STATES PATENTS

| | | | |
|---|---|---|---|
| 219,266 | 9/79 | Huff | 76—31 |
| 2,078,399 | 4/37 | Marsh et al. | 76—31 X |
| 3,060,768 | 10/62 | Tremblay | 76—36 |

GRANVILLE Y. CUSTER, Jr., *Primary Examiner.*

ARTHUR M. HORTON, *Examiner.*